March 21, 1972   J. C. ERICKSON   3,651,192
PROCESS FOR MAKING PLASTIC CONTACT LENS BLANKS
Filed Dec. 11, 1969   2 Sheets-Sheet 1
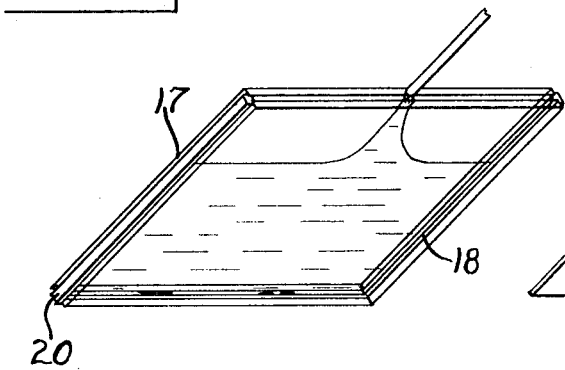
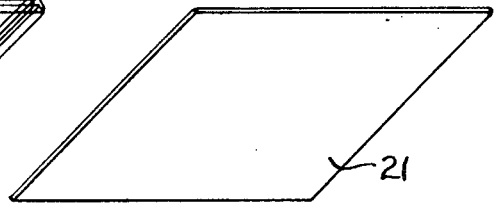
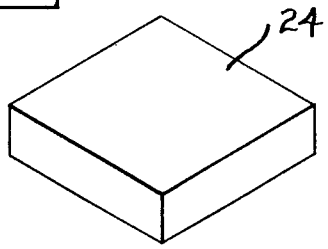
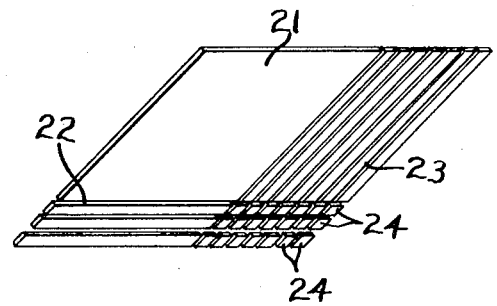
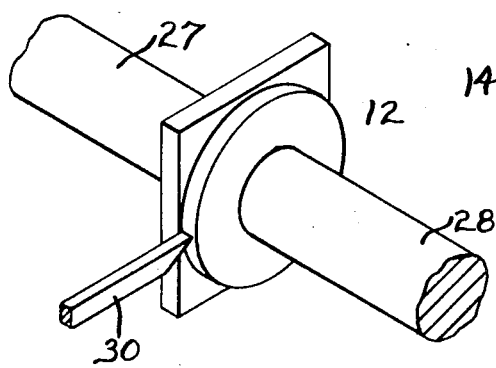
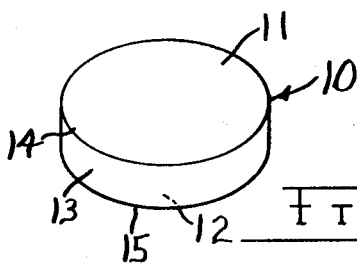
INVENTOR.
John C. Erickson
BY
Wells, St. John & Roberts
Attys

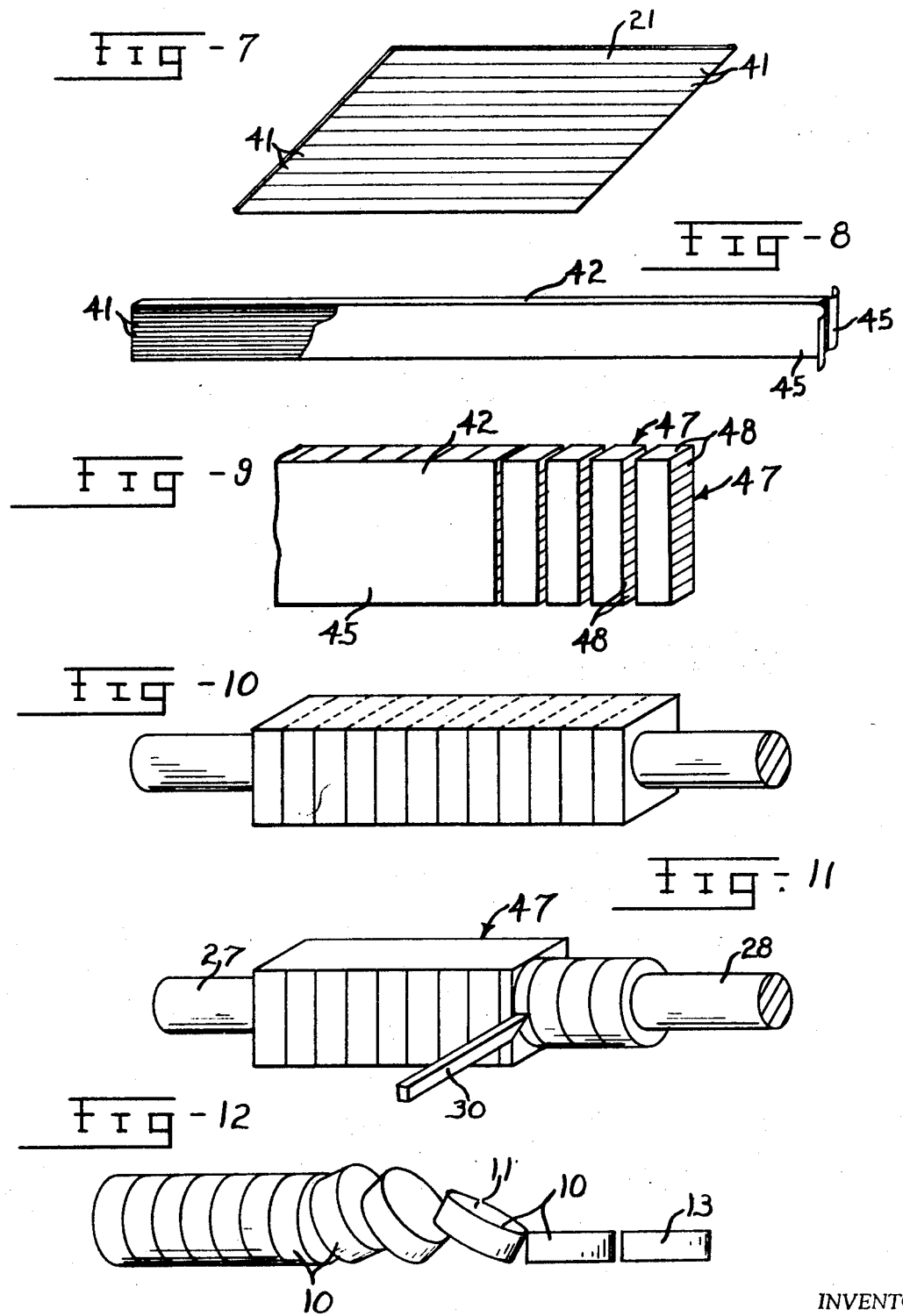

United States Patent Office 3,651,192
Patented Mar. 21, 1972

3,651,192
PROCESS FOR MAKING PLASTIC CONTACT
LENS BLANKS
John Chester Erickson, P.O. Box 2621, Terminal Annex,
Spokane, Wash. 99220
Filed Dec. 11, 1969, Ser. No. 884,263
Int. Cl. B29c 17/10; B29d 11/00
U.S. Cl. 264—160            2 Claims

ABSTRACT OF THE DISCLOSURE

Plastic contact lens blanks are formed by pouring the plastic between two parallel spaced glass sheets to form a resultant plastic sheet having smooth clear surfaces and a uniform density and refractive index. The plastic sheet is then cut into squares that are slightly larger than the diameter of the desired circular blanks. The square pieces are positioned between spindles and rotated while the periphery is being machined by a cutting tool down to the desired diameter.

BACKGROUND OF THE INVENTION

This invention relates to the manufacture of contact lens and more particularly to the manufacture of plastic corneal contact lens blanks that are subsequently machine-turned to prescription for human application.

Background prior art references include the following U.S. Pats.: 1,457,804; 2,240,157; 2,241,415; 2,437,436; 2,438,743; 2,644,985; and 2,664,025.

One of the principal problems associated with the manufacture of contact lens is the inability to produce plastic contact lens blanks having the same density. Density variations within each blank and density variations between separate blanks is a constant problem resulting in an inadequate product and dissatisfied patients.

The importance of uniform density cannot be overemphasized. Should the density or refractive index vary within the blank, the resultant lens must be discarded because of built-in astigmatism. It is only after the lens have been machined that this defect becomes noticeable. Another very distressing problem is that the refractive index may vary from blank to blank even though the blanks came from the same batch. The degree of curvature of a finished lens is dependent upon the refractive index of the material used. Variations in the refractive index between blanks will produce lenses that vary from the desired prescription, even though the lenses are machined with the same curvature.

A further problem frequently associated with plastic contact lenses is referred to as "instability." It has been found that sometimes contact lenses deform and change shape after a period of years. Initially the lenses are machined to prescription and fitted on the patient. After a period of time, the plastic lens will, through internal stresses, change shape slightly causing the lens to deviate from the desired prescription. Frequently the patient takes the lens back to the dispenser and complains of an improper fit. Through no fault of the dispenser, a new set has to be manufactured. As a consequence the dispenser's reputation suffers.

Most corneal plastic contact lens blanks are formed by initially casting from plastic material into a long rod that is held vertically during curing. The rod is then transversely sliced to form cylindrical lens blanks.

It has been found that lens blanks coming from the same rod will frequently vary in density depending upon where the blanks were taken. It has been found that blanks taken from the lower end of the rod have a higher density than those taken from the top end. Furthermore, the slicing of the rod produces rough surfaces on the blanks preventing the lens cutter from seeing through the blanks to determine if the blanks contain any inclusions. Frequently the inclusions only show up after the lens has been machine-turned to prescription.

One of the principal objects of this invention is to provide a method of making plastic contact lens blanks from polymethyl methacrylate material in such a manner as to provide resultant contact lenses with uniform densities and refractive indexes.

An additional object of this invention is to provide a method for efficiently and accurately forming contact lens blanks from polymethyl methacrylate plastic material with smooth surfaces to enable the dispenser to see if there are any inclusions in the blanks.

A further object of this invention is to provide a method of efficiently machining a plurality of contact lens blanks from cast polymethyl methacrylate sheet material with a minimum of waste.

An additional object is to provide an efficient method of mass producing contact lens blanks with a minimum of machine operations and a minimum of rejections and a higher quality product.

These and other objects and advantages of this invention will become apparent upon the reading of the following detailed description of preferred and alternate embodiments.

BRIEF DESCRIPTION OF THE DRAWINGS

Preferred and alternate embodiments of this invention are illustrated in the accompanying drawings, in which:

FIG. 1 is an illustrative perspective view of the casting of a sheet of plastic material between two sheets of glass;

FIG. 2 is a perspective view of a plastic sheet formed as illustrated in FIG. 1;

FIG. 3 illustrates the step of cutting the sheet transversely and longitudinally to form a plurality of square pieces;

FIG. 4 is an enlarged perspective view of an individual piece that has been cut as illustrated in FIG. 3;

FIG. 5 illustrates the step of mounting each piece between two spindles, rotating the piece and machining the periphery to form a cylindrical button or blank;

FIG. 6 is an enlarged perspective view of a finished machine-turned contact lens blank;

FIGS. 7–12 illustrate an alternate method of forming the contact lens blanks in which;

FIG. 7 illustrates the step of cutting the sheet into a plurality of individual strips;

FIG. 8 illustrates the step of stacking twelve strips one-on-top-of-each-other and then securing the strips together to form a bundle by applying tape along the sides of the bundle;

FIG. 9 illustrates the step of slicing the bundle of strips at precise intervals to form a plurality of blocks each having twelve square pieces secured together by the tape;

FIG. 10 illustrates the positioning of a block longitudinally between two spindle members, with the spindles engaging the end pieces;

FIG. 11 shows the rotation of the spindles and the machine-turning of the periphery of the individual pieces to turn each piece to a desired diameter; and FIG. 12 illustrates the step of removing the spindles from the machined pieces forming tweleve finished contact lens blanks.

DETAILED DESCRIPTION OF THE PREFERRED AND ALTERNATE EMBODIMENTS

A contact lens blank 10 (FIG. 6) is a button-shaped transparent solid object that is quite hard and machineable which has a thickness less than the diameter. The blank has flat parallel face surfaces 11 and 12 and a cylindrical periphery 13. The periphery and flat surfaces intersect at sharp edges 14 and 15. Generally corneal contact lens blanks 10 are ½ inch in diameter and have a thickness of 3/16 of an inch.

After substantial experimentation and testing, it has been found that a cast polymethyl methacrylate sheet manufactured by the Building Products Division of American Cyanamid Company under the trademark "Acrylite," has superior properties for use as contact lens material. It is found that such material is extremely stable over a long period of time and that the sheet material has a very uniform density and refractive index and an extremely low internal strain. The "Acrylite" sheets have the following physical properties:

| Property | ASTM method | Average value |
|---|---|---|
| Specific gravity | D-792-60 | 1.19 |
| Mechanical: | | |
| Tensile strength | D-638-60T | |
| Rupture, p.s.i. | | 10,000 |
| Modulus of elasticity, p.s.i. | | 400,000 |
| Ultimate longation, percent | | 5.1 |
| Flexural strength | D-790-61 | |
| Rupture, p.s.i. | | 16,500 |
| Modulus of elasticity, p.s.i. | | 475,000 |
| Compressive strength | D-696-61T | |
| Yield, p.s.i. | | 18,000 |
| Modulus of elasticity, p.s.i. | | 475,000 |
| Compressive deformation under load | D-621-59 | |
| 2,000 p.s.i. at 50 C., 24 hrs., percent | | .52 |
| 4,000 p.s.i. at 58 C., 24 hrs., percent | | 1.04 |
| Shear strength, p.s.i. | D-732-46 | 9,000 |
| Impact strength | D-256-56 | |
| Charpy unnotched (½"x½" section), ft. lbs. | | 3.3 |
| Izod milled notched, ft. lbs. per inch of notch | | .33 |
| Rockwell hardness | D-785-60T | M-94 |
| Internal strain, percent | D-702-60T | 1.73 |
| Refractive index | D-542-50 | 1.49 |
| Luminous transmittance, percent | D-791 | .92 |
| Effect of accelerated weathering on appearance of clear material | D-795-57 | (1) |
| Displacement factor | D-637-50 | 50 |
| Flammability, in./min. | D-635-56T | 1.1 |
| Water absorption | D-570-59 | |
| Wt. gain on immersion 24 hrs., percent | | 0.2 |
| Ordor | | None |
| Taste | | None |
| Electrical: | | |
| Dielectric strength | D-149-61 | |
| Short time test, volts/mil | | 500 |
| Step by step, volts/mil | | 431 |
| Dielectric constant | D-150-59T | |
| 60 cycles | | 3.7 |
| 10³ cycles | | 3.3 |
| 10⁶ cycles | | 2.7 |
| Power factor | D-150-59T | |
| 60 cycles | | .06 |
| 10³ cycles | | .04 |
| 10⁶ cycles | | .02 |
| Loss factor | D-150-59T | |
| 60 cycles | | .21 |
| 10³ cycles | | .13 |
| 10⁶ cycles | | .06 |
| Arc resistance | D-495-61 | (²) |
| Volume resistivity, ohm cm | D-257-61 | 1.6×10¹⁶ |
| Surface resistivity, ohm/square | D-257-61 | 1.9×10¹⁵ |
| Thermal: | | |
| Hot forming temperature, °F | | 290-360 |
| Heat distortion temperature, °F | D-648-56 | |
| 2° C./min., 264 p.s.i. | | 210 |
| 2° C./min., 66 p.s.i. | | 230 |
| Maximum recommended continuous service temperature, °F | | 180 |
| Coefficient of thermal expansion | D-696-44 | |
| Inches/inch/° F | | .000031 |
| Coefficient of thermal conductivity (Cenco-Fitch), b.t.u.: | | |
| (Hr.) (sq. ft.) (° F./in.) | | 1.63 |
| Specific heat at 77° F., B.t.u./(Lb.) (° F.) | | .35 |

¹ No crazing, discloration or warpage.
² No tracking.

The "Acrylite" sheet material is non-toxic and chemically inert to ocular tissue and secretions.

The sheet material is cast by pouring the methyl methacrylate material between two glass sheets 17 and 18 that are spaced a distance substantially equal to the thickness of the desired contact lens. A gasket material 20 is placed about the periphery of the sheets to form a thin cavity for receiving the plastic material. The sheets 17 and 18 are inclined at about 45° to the horizontal to receive prepared flowable methyl methacrylate.

After the entire thin cavity is filled, the plastic material is cured by heat. FIG. 2 shows a resultant transparent sheet 21 that has been formed by such process. The sheet has smooth surfaces enabling one to view through the sheet. The sheet is extremely uniform in density and has a uniform refractive index. As previously mentioned, the formed sheet has a specific gravity of 1.19 and a refractive index of 1.49.

The next step is to cut the sheet in the longitudinal direction 22 and transverse direction 23 to form a plurality of square pieces 24. At this point it should be noted that since the thickness of this sheet is identical to the desired thickness of contact lens blanks; no additional machining is required of the face surfaces of the sheet in the formation of the blanks.

After a great deal of experimentation and testing, it has been found that the only acceptable way to form the desired circular blank in a minimum of steps is to place each piece 24 between two spindles 27 and 28 and then rotate the spindles in front of a cutting tool 30. The cutting tool machines the edge of the piece 24 down to the desired diameter to form a cylindrical finished blank 10 having the desired physical and dimensional characteristics without damaging the edges 14 and 15.

It was found that the most efficient way of forming said blanks from sheet material with a minimum number of rejects and minimum amount of waste, is to initially cut the sheet into square pieces that are ⅝ inch on a side. The blanks are then machine-turned down to the ½ inch as a finished product.

FIGS. 7–12 illustrate an alternate and more specific method of mass producing the contact lens blanks from a sheet 21. Initially the sheet is cut into a plurality of equal size strips 41 as shown in FIG. 7. The strips are then stacked in face to face relationship to form an elongated rectangular bundle 42. Adhesive tape 45 is secured to the sides of the bundle 42 to secure the individual strips together for further processing.

The bundle 42 is then sliced (FIG. 9) at uniform intervals in a transverse direction across the tape to form a plurality of rectangular blocks 47 composed of a stack of square pieces 48 that are in face to face engagement, secured together by sections of the tape. Each piece is slightly larger than the desired diameter of the finished blank. Each blank 47 is then mounted between two lathe spindles and rotated, presenting the peripheries of the pieces to a cutting tool to turn the pieces to the desired diameter. The machine operation illustrated in FIG. 11 may be accomplished by holding the machine tool 30 stationary and moving the spindles 27 and 28 longitudinally at a uniform rate to machine-turn the block pieces or by holding the block longitudinally stationary while moving the machine tool in a longitudinal direction to machine-turn the pieces in the block. It should be noted, during the machine-turning operation the tape is removed, requiring no additional removal process. After the machine-turning is completed, the spindles are separated, dropping the formed blanks.

After much experimentation, it was found that the most efficient operation can be obtained by stacking strips one-on-top-of-each-other to form a bundle of twelve strips. The width of each strip is ⅝ inch. The bundles are then cut at ⅝ intervals to form blocks each having twelve square pieces that are ⅝ inch on a side. The block of twelve pieces is then positioned between the spindles. It has been found that with a spindle pressure of approximately 300 p.s.i. on the ends of the block, the block of twelve pieces can be held without any substantial bending deflection, or sliding or deformation, occurring during the machining operation.

Although in retrospect the preferred and alternate embodiments of this invention seem extremely simple, such simplicity is only suggested by the applicant's invention and not by the prior art.

It should be understood that the above described embodiments are simply illustrative of the principles of this invention and that numerous other embodiments may be devised, incorporating the principles thereof. Therefore, only the following claims are intended to define the invention.

What is claimed is:

1. A method of forming a button-shaped thermoplastic contact lens blank of a prescribed thickness and diameter with smooth top and bottom surfaces which is non-toxic and chemically inert to ocular tissues and secretions and which is transparent when viewed through the top and bottom surfaces for use in the manufacture of corneal contact lenses for human beings, said method comprising the steps of:
   (a) forming a sheet of transparent polymethyl methacrylate having a thickness equal to said prescribed thickness with smooth top and bottom surfaces;
   (b) initially cutting the transparent polymethyl methacrylate sheet into strips, each strip having a width slightly greater than the desired diameter;
   (c) stacking a plurality of strips on each other to form a bundle;
   (d) securing the strips together;
   (e) cutting the bundle at uniform intervals equal to the width of each strip to form a plurality of blocks, in which each block is composed of a stack of square pieces;
   (f) mounting each block between lathe spindles; and
   (g) machine-turning the block to cut the periphery of each piece in the block to the prescribed diameter to form a plurality of contact lens blanks during each machine-turning operation.

2. The method for forming contact lens blanks as defined in claim 1 wherein said securing comprises the steps of:
   applying an adhesive tape material along the sides of the bundle to hold the strips together so that as the blocks are cut from the bundle the square pieces are automatically held together and the tape material is automatically removed from the blanks during the machine-turning to produce unconnected blanks at the conclusion of the machine-turning operation.

References Cited

UNITED STATES PATENTS

| | | | |
|---|---|---|---|
| 2,302,918 | 11/1942 | Smith | 264—1 |
| 1,871,752 | 8/1932 | Simonds. | |
| 3,221,083 | 11/1965 | Crandon | 264—1 |
| 2,230,118 | 1/1941 | Moulton | 264—1 |
| 3,496,254 | 1/1970 | Wichterle | 264—162 X |

FOREIGN PATENTS

| | | | |
|---|---|---|---|
| 619,384 | 3/1949 | Great Britain | 264—1 |

ROBERT F. WHITE, Primary Examiner

A. M. SOKAL, Assistant Examiner

U.S. Cl. X.R.

29—415, 423; 264—1, 162